United States Patent
Miller et al.

(10) Patent No.: US 10,914,303 B2
(45) Date of Patent: Feb. 9, 2021

(54) IRRIGATION SYSTEM BOOSTER PUMP ASSEMBLY WITH VARIABLE FREQUENCY DRIVE AND AXIAL FLUX MOTOR

(71) Applicant: LINDSAY CORPORATION, Omaha, NE (US)

(72) Inventors: Mark William Miller, Elkhorn, NE (US); Matthew James Phillips, Columbus, NE (US)

(73) Assignee: Lindsay Corporation, Omaha, NE (US)

( * ) Notice: Subject to any disclaimer, the term of this patent is extended or adjusted under 35 U.S.C. 154(b) by 37 days.

(21) Appl. No.: 16/297,929

(22) Filed: Mar. 11, 2019

(65) Prior Publication Data

US 2020/0291933 A1  Sep. 17, 2020

(51) Int. Cl.
  *F04B 49/20* (2006.01)
  *F04B 17/03* (2006.01)
  *A01G 25/09* (2006.01)

(52) U.S. Cl.
  CPC .............. *F04B 49/20* (2013.01); *F04B 17/03* (2013.01); *A01G 25/092* (2013.01)

(58) Field of Classification Search
  CPC ......... F04B 49/20; F04B 17/03; A01G 25/092
  See application file for complete search history.

(56) References Cited

U.S. PATENT DOCUMENTS

| | | | | |
|---|---|---|---|---|
| 4,209,131 A | * | 6/1980 | Barash | A01G 25/16 |
| | | | | 137/624.2 |
| 4,277,023 A | * | 7/1981 | Anderson | A01G 25/092 |
| | | | | 239/11 |
| 6,922,004 B2 | | 7/2005 | Hashimoto et al. | |
| 6,928,339 B2 | | 8/2005 | Barker | |
| 2004/0093912 A1 | | 5/2004 | Krieger et al. | |
| 2010/0032493 A1 | | 2/2010 | Abts et al. | |
| 2012/0253530 A1 | | 10/2012 | Malsam | |
| 2013/0002658 A1 | | 1/2013 | Kunath et al. | |
| 2013/0008977 A1 | * | 1/2013 | Pfrenger | A01G 25/092 |
| | | | | 239/69 |
| 2013/0020410 A1 | * | 1/2013 | Conrad | B05B 1/005 |
| | | | | 239/290 |
| 2013/0049512 A1 | | 2/2013 | Jung | |

* cited by examiner

*Primary Examiner* — Viet Le
*Assistant Examiner* — Steven M Cernoch
(74) *Attorney, Agent, or Firm* — Hovey Williams LLP

(57) ABSTRACT

An irrigation system broadly comprising a number of irrigation spans, an end gun, an end gun booster pump assembly having a booster pump and a booster pump motor, and a control system including a system controller and a variable frequency drive (VFD) for controlling the end gun pump motor. The system controller determines a desired end gun throw magnitude according to sensor inputs, irrigation system location information, user inputs, and/or other data and sends to the VFD a signal representative of an instruction to increase or decrease an electrical motor input for the booster pump motor. The VFD effects a booster pump motor speed via the electrical motor input so that the booster pump steps up water pressure to the end gun according to the desired end gun throw magnitude.

7 Claims, 4 Drawing Sheets

IRRIGATION SYSTEM BOOSTER PUMP ASSEMBLY WITH VARIABLE FREQUENCY DRIVE AND AXIAL FLUX MOTOR

BACKGROUND

Irrigation systems such as center pivot and linear irrigation systems often have end guns configured to dispense water to field corners and other areas. End gun control is often based solely on an end gun's position in a field. End gun control patterns are often preset and thus cannot account for irrigation plan inaccuracies or changes, environmental factors such as wind and humidity, user inputs, and alternative system modes such as a water conservation mode or fault mode. End gun output is either toggled on/off or switched between a few constant settings such as half power and full power. This leaves portions of field corners unirrigated, underirrigated, or even over-irrigated. Furthermore, abrupt power changes and limited power settings may stress the end gun booster pump motor.

SUMMARY

Embodiments of the present invention solve the above-described and other problems and limitations by providing an improved irrigation system that effects more dynamic and adaptive end gun spray control.

An embodiment of the invention is a center pivot irrigation system broadly comprising a central pivot, a main section, an end gun and an end gun booster pump assembly on the main section, and a control system configured to control end gun spray via a variable frequency drive. Other embodiments of the invention may comprise linear move irrigation systems or hose reel/traveling gun systems without departing from the scope of the invention.

The central pivot distributes water or other fluids to the main section and may be a tower, a standpipe, or the like. The central pivot may include a support structure for withstanding radial loads, axial loads, and twisting loads.

The main section comprises a number of mobile support towers and a number of truss sections that interconnect the mobile support towers.

Each of the mobile support towers elevates adjacent truss sections and may include an "A-frame" or similar structure for supporting an end of one of the truss sections, a number of wheels connected to the A-frame for traversing across a field, and a motor for powering the wheels. Each mobile support tower may also include a controller and sensors for activating the motor according to a position of the mobile support tower or a relative angle of the adjacent truss sections.

Each of the truss sections carries or otherwise supports a pipe or other fluid mechanism connected in fluid communication with other pipes to form a number of interconnected spans. A number of sprinklers, spray guns, drop nozzles, or other fluid emitting devices are spaced along the pipes to apply water and/or other fluids to ground areas underneath the irrigation system.

The end gun is connected to the pipe of the outermost truss section via the end gun booster pump assembly. The end gun may include a nozzle angled upward and outward from the irrigation system, an oscillating mechanism, and a flipper arm. The oscillating mechanism cyclically changes an azimuth of the nozzle and may be motor or fluid driven. The flipper arm periodically disperses water emitted from the nozzle and includes a dispersion plate and a counterweight configured to urge the dispersion plate into a path of the emitted water via gravity.

The end gun booster pump assembly increases water pressure to the end gun and includes a booster pump and a booster pump motor. The end gun booster pump assembly may be connected directly to the end gun or may be positioned elsewhere on the irrigation system.

The booster pump delivers water to the end gun and may be axially aligned with an axis of the booster pump. The booster pump may be a centrifugal pump, a screw pump, or any other suitable pump.

The booster pump motor drives the booster pump and is mounted on the outermost mobile support tower and connected between the pipe and the end gun. The booster pump motor may be an axial flux motor, an AC inductance motor, or any other suitable motor. An axial flux motor provides several benefits over an AC inductance motor. For example, an axial flux motor is more efficient and has a lighter weight for the same output power. Axial flux motors are also easier to install in the field.

The control system dictates movement and fluid delivery of the irrigation system and includes a system controller, a number of alignment sensors, a number of wheel motor controllers, a number of status sensors, and a variable frequency drive (VFD) for controlling the booster pump motor. The control system may be mounted on the central pivot of the irrigation system or mounted remotely and may include or communicate with a user input and/or a remote computing device via a wireless network. The control system may also be configured to receive data signals from external systems such as a GPS satellite.

The VFD effects variable output of the booster pump motor via an electrical motor input such as a frequency or voltage, or a function or a profile thereof, and may include computing components such as a processor and a memory, and electronic components such as rectifiers, inductors, capacitors, inverters, transceivers, and power components. In one embodiment, the VFD converts AC supply power to DC power and then converts the DC power into AC power with variable frequency and variable voltage.

The booster pump motor (and hence the end gun) may be controlled as follows. First, statuses of the irrigation system are sensed via the alignment sensors and/or the status sensors. Alternatively or additionally, GPS locational data or similar data may be received.

The system controller or another computing component of the control system may then determine a desired end gun throw magnitude according to the statuses. Alternatively or additionally, the system controller may receive a signal representing data, an instruction, or a user input corresponding to a desired end gun throw magnitude. The end gun throw magnitude may be in terms of a throw distance, an effective throw distance, an initial throw velocity, an initial throw speed, a flow rate, a flow volume, a water pressure, a water pressure step amount, or the like.

An instruction to increase or decrease an electrical motor input for the booster pump motor via the VFD based on the desired end gun throw magnitude may then be generated. The electrical motor input may be a motor input frequency and/or a motor input voltage, or a function or profile thereof. For example, the instruction may be to increase an input frequency and voltage to the booster pump motor for increasing its speed.

A signal representative of the electrical motor input instruction may then be generated. The electrical motor input instruction signal may then be transmitted wirelessly via a transceiver or through a wired connection. The VFD may then receive the electrical motor input instruction signal via another transceiver or through the wired connection.

The VFD may then increase or decrease the electrical motor input according to the electrical motor input instruction. This increases or decreases the booster pump motor speed accordingly. The booster pump motor thereby drives the booster pump so that the booster pump steps up water pressure to the end gun according to the desired end gun throw magnitude.

The above-described irrigation system provides several advantages. For example, the VFD dynamically controls the booster pump motor so that the application of water is more closely tailored to a field shape or irrigation area. Water is thereby applied more uniformly throughout the irrigation cycle. The precision of the VFD allows for a wider variety and higher number of variables to be factored into the desired end gun throw magnitude and allows for quicker end gun response. For example, the end gun throw magnitude can be adjusted for a change in wind direction and can more effectively react to a user override or an electrical or mechanical issue. The VFD also reduces stress on the booster pump motor. The booster pump motor may be an axial flux motor, which has increased efficiency and has a higher output power to weight ratio.

This summary is not intended to identify essential features of the present invention, and is not intended to be used to limit the scope of the claims. These and other aspects of the present invention are described below in greater detail.

DESCRIPTION OF THE DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
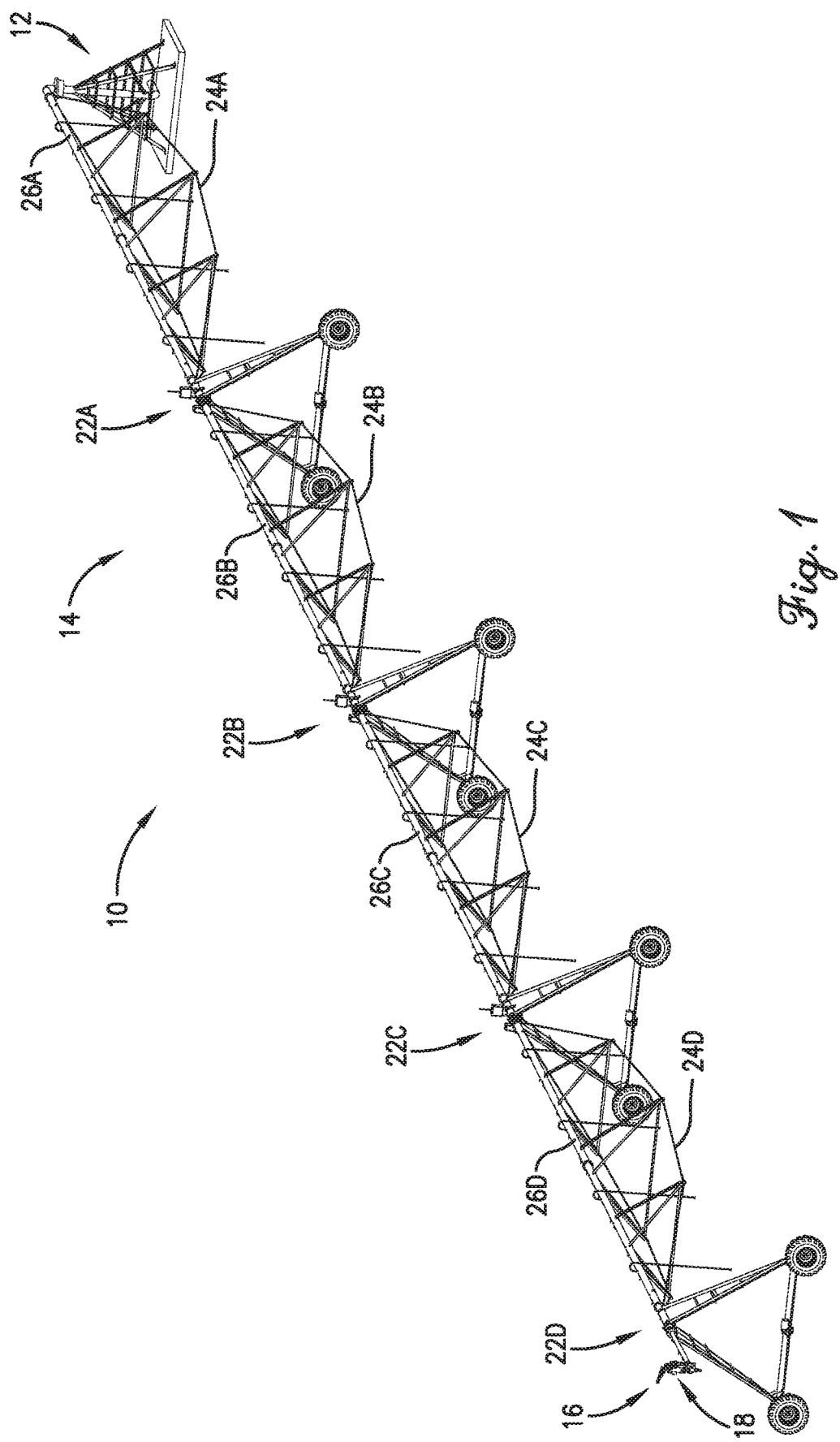
FIG. 1 is a perspective view of an exemplary central pivot irrigation system constructed in accordance with an embodiment of the invention.
Figure 2:
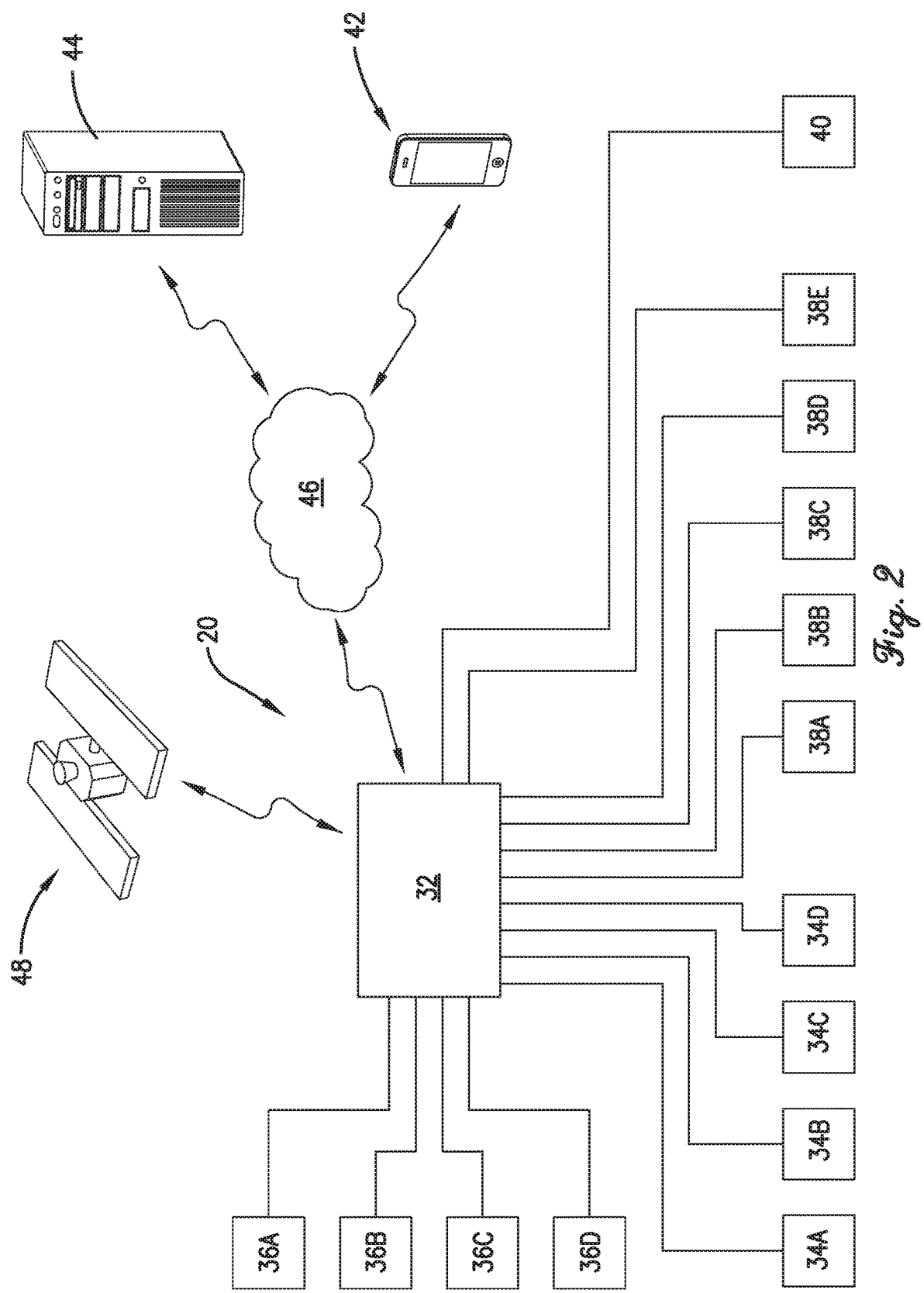
FIG. 2 is a schematic view of a control system of the irrigation system of FIG. 1.
Figure 3:
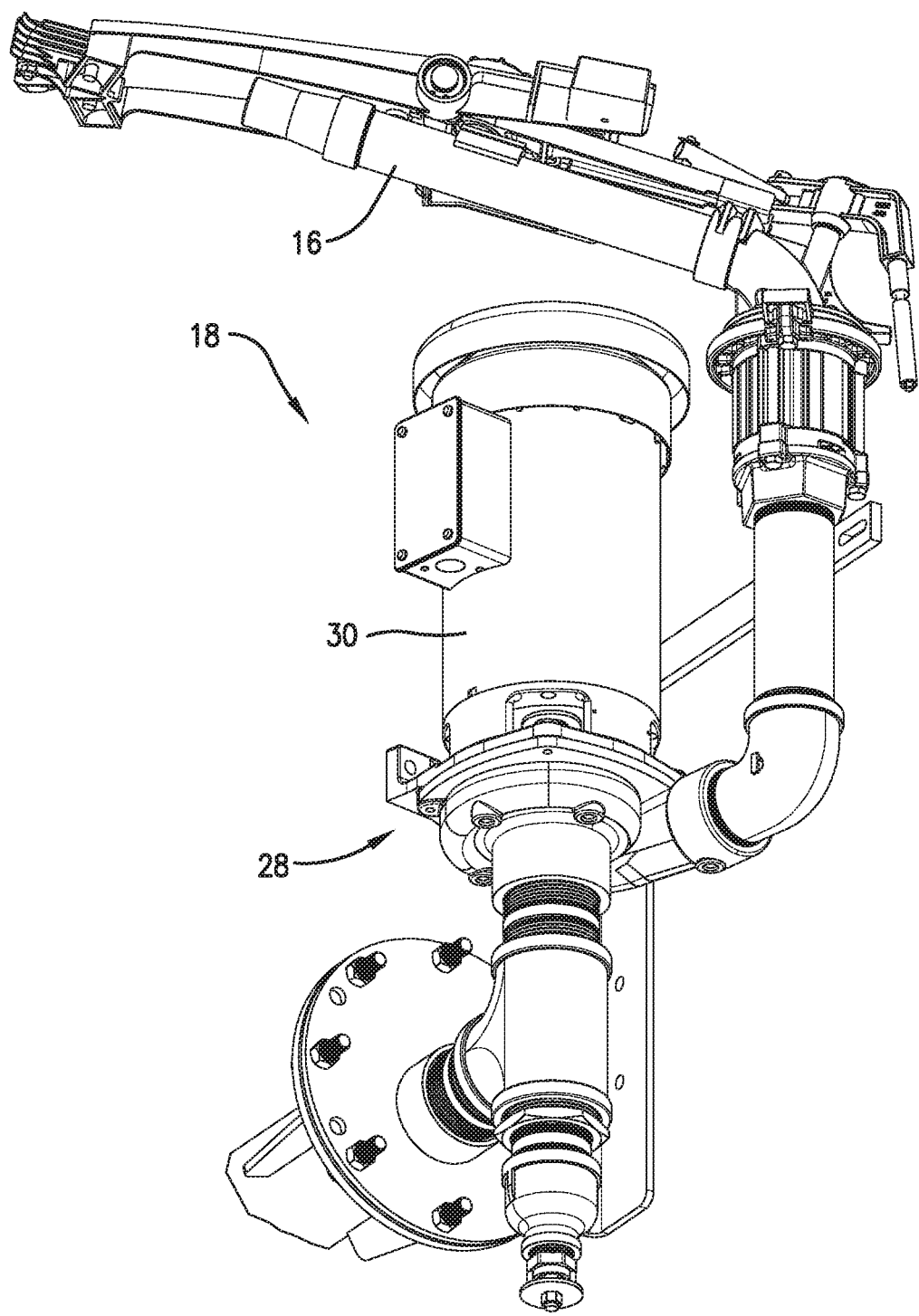
FIG. 3 is a perspective view of an end gun booster pump assembly of the irrigation system of FIG. 1.

Turning to FIGS. 1-3, a mobile irrigation system 10 constructed in accordance with embodiments of the present invention is illustrated. The irrigation system 10 is a central pivot irrigation system broadly comprising a central pivot 12, a main section 14, an end gun 16, an end gun booster pump assembly 18, and a control system 20 having a variable frequency drive (VFD) for controlling a booster pump of the end gun booster pump assembly 18. Embodiments of the invention may also be implemented in other irrigation systems such as linear move irrigation systems and hose reel/traveling gun systems without departing from the scope of the invention.

The central pivot 12 distributes water or other fluids to the main section 14 and may be a tower, a standpipe, or the like. The central pivot 12 may include a support structure for withstanding radial loads, axial loads, and twisting loads, a non-rotatable vertically extending pipe, and a rotatable elbow. The non-rotatable vertically extending pipe carries the fluids to an elevated height. The rotatable elbow connects the main section 14 to the non-rotatable vertically extending pipe such that the main section 14 is free to pivot about the central pivot 12 while remaining connected thereto.

The main section 14 comprises a plurality of mobile support towers 22A-D and a plurality of truss sections 24A-D. The main section 14 illustrated in FIG. 1 includes four mobile support towers and four truss sections; however, it may comprise any number of mobile support towers and truss sections without departing from the scope of the present invention.

Each of the mobile support towers 22A-D elevates adjacent truss sections 24A-D and may include an "A-frame" or similar structure for supporting an end of one of the truss sections 24A-D, a number of wheels connected to the A-frame for traversing across a field, and a motor for powering the wheels. Each mobile support tower 22A-D may also include a controller (described below) for activating the motor according to a position of the mobile support tower or a relative angle of the adjacent truss sections 24A-D.

Each of the truss sections 24A-D carries or otherwise supports a pipe 26A-D or other fluid mechanism connected in fluid communication with the other pipes to form a number of interconnected spans. A plurality of sprinklers, spray guns, drop nozzles, or other fluid emitting devices are spaced along the pipes 26A-D to apply water and/or other fluids to ground areas underneath the irrigation system 10.

The end gun 16 is connected to the pipe 26D of the outermost truss section 24D via the end gun booster pump assembly 18 and may include a nozzle extending upward and outward from the outermost mobile support tower 22D. The end gun 16 may include an oscillating mechanism and a flipper arm. The oscillating mechanism cyclically changes an azimuth of the nozzle and may be motor or fluid driven. The flipper arm periodically disperses water emitted from the nozzle and includes a dispersion plate and a counterweight configured to urge the dispersion plate into a path of the emitted water via gravity.

The end gun booster pump assembly 18 steps up water pressure to the end gun 16 and may include a booster pump 28 and a booster pump motor 30. The booster pump 24 may be mounted on the outermost mobile support tower 22D and connected between the pipe 26D and the end gun 16.

The booster pump 28 delivers water to the end gun 16 and may be oriented such that a rotary axis of the booster pump 28 extends vertically to the end gun 16. The booster pump 28 may be a centrifugal pump, a screw pump, or any other suitable pump. For example, if the booster pump 28 is a centrifugal pump, the inlet may be positioned near a bottom of the booster pump 28, the outlet may be oriented horizontally, and the drive shaft may extend upward from a top of the booster pump 28.

The booster pump motor 30 drives the booster pump 28 and may be an axial flux motor, an AC inductance motor, or any other suitable motor. An axial flux motor provides several benefits over an AC inductance motor. For example, an axial flux motor is more efficient and has a lighter weight for the same output power. Axial flux motors are also easier to install in the field.

The control system 20 dictates movement and fluid delivery of the irrigation system 10 and may include a system controller 32, a plurality of alignment sensors 34A-D, a number of wheel motor controllers 36A-D, a plurality of status sensors 38A-E, and a variable frequency drive (VFD) 40 for controlling the booster pump motor 30. The control system 20 may be mounted on the irrigation system 10 and/or may include or communicate with a user input 42 and/or remote communications equipment or remote computing device 44 via a wireless network 46. The control system 20 may also be configured to receive data signals from external systems such as a GPS satellite 48.

The system controller 32 manages the wheel motor controllers 36A-D and the VFD 40 and may include computing components such as a processor, a memory, power components, and communication components for communicating with the wheel motor controllers 36A-D, VFD 40, user input 42, and/or remote communications equipment or computing device 44 over the wireless network 46. The system controller 32 may run a computer program stored in or on a computer-readable medium residing on or assessible by the system controller 32. The computer programs preferably comprise ordered listings of executable instructions for implementing logical functions in the system controller 32, wheel motor controllers 36A-D, VFD 40, user inputs 42 and/or remote communications equipment or computing devices 44. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate, or transport the program for use by or in connection with the instruction execution system, apparatus, or device. The computer-readable medium can be, for example, but is not limited to, an electronic, magnetic, optical, electromagnetic, infrared, or semi-conductor system, apparatus, device or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium may be one or more components incorporated into the wheel motor controllers 36A-D, VFD 40, user input 42, and/or remote communications equipment or computing device 44.

The memory of the system controller 32 may include, for example, removable and non-removable memory elements such as RAM, ROM, flash, magnetic, optical, USB memory devices, and/or other conventional memory elements. The memory may store various data associated with the control system 20, such as the computer program and code segments mentioned above, or other data for instructing the wheel motor controllers 36A-D and VFD 40 to perform the steps described herein. Further, the memory may store data retrieved from the wheel motor controllers 36A-D, VFD 40, user input 42, and/or remote communications equipment or computing device 44.

The alignment sensors 34A-C sense an angle of one of the irrigation spans relative to an adjacent irrigation span or center pivot 12 and may be a contact sensor, a magnetic sensor, or any other suitable sensor positioned on or near the center pivot 12, one of the mobile support towers 22A-C, and/or one of the truss sections 24A-D. For example, contact sensors may be positioned on each truss section 24A-D near the center pivot 12 and mobile support towers 22A-C such that an electrical circuit becomes closed when one of the irrigation spans reaches a pre-set alignment angle (e.g., 10 degrees) indicating that the mobile support tower is misaligned.

The wheel motor controllers 36A-D activate the wheel motors of the mobile support towers 22A-D according to instructions received from the system controller 32 and may include a processor, a memory, a user interface, a power component, and a communication component for communicating with the system controller 32, user input 42, and/or remote communications equipment or remote computing device 44 over the wireless network 46. Alternatively, the wheel motor controllers 36A-D may act independently of the system controller 32. The wheel motor controllers 36A-D may be encased in a waterproof housing or otherwise sealed from the environment to protect them from water, dust, and sunlight.

The status sensors 38A-E sense statuses of the irrigation system 10 and may include alignment sensors (such as alignment sensors 34A-C), a wind sensor, a water pressure sensor, a location sensor, an electrical sensor, a temperature sensor, humidity sensors, a barometric pressure sensor, and the like. For example, status sensor 38A may be a wind sensor configured to sense a wind speed, a wind direction, or a wind velocity. Status sensor 38B may be a water pressure sensor positioned upstream or downstream of the booster pump 28 for sensing a water pressure upstream or downstream of the booster pump 28. Status sensor 38C may be a position sensor for sensing a location of one of the mobile support towers 22A-D, one of the truss sections 24A-D, or any other part of the irrigation system 10. Status sensor 38D may be an electrical sensor for sensing electrical issues or electrical statuses of the irrigation system 10. Status sensor 38E may be a temperature sensor for sensing ambient air temperature. Another status sensor may sense an azimuth and/or a vertical angle of the end gun 16.

The VFD 40 effects variable output of the booster pump motor 30 via an electrical motor input such as a frequency or voltage, or a function or profile thereof, and may include computing components such as a processor and a memory, and electronic components such as rectifiers, inductors, capacitors, inverters, transceivers, and power components. In one embodiment, the VFD 40 converts AC supply power to DC power and then converts the DC power into AC power with variable frequency and variable voltage. The VFD 40 may produce ramping functions, stepping functions, power optimization profiles, cyclic profiles, or any other dynamic electrical motor input.

The user input 42 permits a user to provide control instructions to or change operating parameters of the irrigation system 10. The user input 42 may include computing elements such as a processor, a memory, a transceiver, and the like. The user input 42 may also include buttons, switches, scroll wheels, display screens, user interfaces, voice input elements such as a microphone, pointing devices such as mice, touchpads, tracking balls, styluses, a camera such as a digital or film camera or video camera, or combinations thereof. The user input 42 may be a smartphone, a tablet, a laptop computer, a desktop computer, a personal electronic assistant, and the like.

The remote computing device 44 allows the control system 20 to retrieve or reference data or receive control instructions therefrom. The remote computing device 44 may include computing elements such as a processor, a memory, a transceiver, and the like. The remote computing device 44 may provide irrigation tables, irrigation plans, field layouts, weather information, and other data. The remote computing device 44 may be a smartphone, a tablet, a laptop computer, a desktop computer, a personal electronic assistant, a server, a server network, a cloud-based system, and the like.

Figure 4:
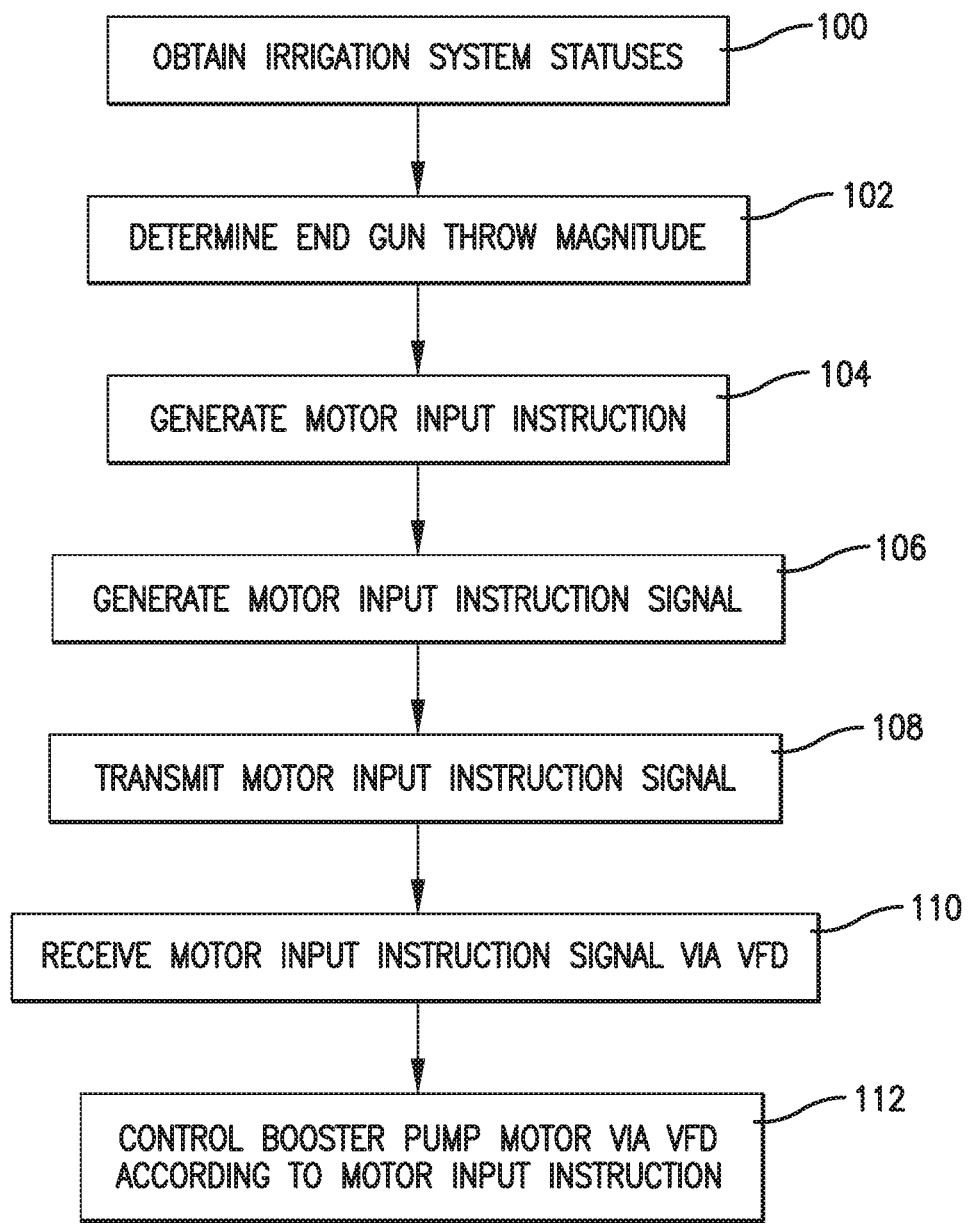
FIG. 4 is a flow diagram of a method of controlling the irrigation system of FIG. 1 in accordance with another embodiment of the invention.

Turning to FIG. 4, an exemplary control scheme for controlling end gun spray will now be described in detail. First, statuses of the irrigation system 10 may be sensed via the alignment sensors 34A-C and/or the status sensors 38A-E, as shown in block 100. For example, the alignment sensors 34A-C may sense angular alignments and/or angular positions of the truss sections 24A-D as the main section 14 traverses the field. Alternatively or additionally, GPS locational data or similar data may be received. Wind sensor 38A may sense a wind speed, a wind direction, or a wind velocity. Water pressure sensor 38B may sense a water pressure upstream or downstream of the booster pump 28. Position sensor 38C may sense a location of one of the mobile support towers 22A-D, one of the truss sections 24A-D, or any other part of the irrigation system 10. Electrical sensor 38D may sense an electrical issue or an electrical status of the irrigation system 10. Temperature sensor 38E may sense an ambient air temperature.

The system controller 32 (or another computing component of the control system 20) may then determine a desired end gun throw magnitude according to the statuses, as shown in block 102. For example, the alignment, position, or location of the truss sections 24A-D may be compared with a corresponding field layout to indicate that the end gun 16 is near a corner of the field and hence the end gun throw magnitude should increase or be set to a higher amount according to a lookup table or other data. The system controller 32 may also determine that the end gun throw magnitude should be increased or set to a higher amount to compensate for a headwind. The end gun throw magnitude may need to be adjusted due to actual water pressure upstream or downstream of the booster pump 28. An electrical issue may require the booster pump motor 30 be set to standby or powered down. The system controller 32 may determine that the end gun throw magnitude should be increased due to a high temperature or low humidity. The end gun throw magnitude may be decreased due to low water availability. The end gun throw magnitude may need to be increased due to a high vertical angle of the end gun 16. Alternatively or additionally, the system controller 32 may receive a signal representing data, an instruction, or a user input corresponding to a desired end gun throw magnitude. The end gun throw magnitude may be in terms of a throw distance, an effective throw distance, an initial throw velocity, an initial throw speed, a flow rate, a flow volume, a water pressure, a water pressure increase, or the like.

An instruction to increase or decrease an electrical motor input for the booster pump motor 30 via the VFD 40 based on the desired end gun throw magnitude may then be generated, as shown in block 104. The electrical motor input may be a motor input frequency and/or a motor input voltage, or a function or profile thereof. For example, the instruction may be to increase an input frequency and voltage to the booster pump motor 30 for increasing its speed.

A signal representative of the electrical motor input instruction may then be generated, as shown in block 106. The electrical motor input instruction signal may then be transmitted wirelessly via a transceiver or through a wired connection, as shown in block 108. The VFD 40 may then receive the electrical motor input instruction signal via a transceiver or through the wired connection, as shown in block 110.

The VFD 40 may then increase or decrease the electrical motor input according to the electrical motor input instruction, as shown in block 112. This increases or decreases the booster pump motor speed accordingly. The booster pump motor 30 thereby drives the booster pump 28 so that the booster pump 28 steps up water pressure to the end gun 16 according to the desired end gun throw magnitude.

The above-described irrigation system 10 provides several advantages. For example, the VFD 40 dynamically controls the booster pump motor 30 (and hence the booster pump 28) so that water is applied more uniformly throughout the irrigation cycle and is closely tailored to a field shape or irrigation area. The precision of the VFD 40 allows for a wider variety and higher number of variables to be factored into the desired end gun throw magnitude and allows for quicker end gun response. For example, the end gun throw magnitude can be adjusted for a change in wind direction and can more quickly react to a user override or an electrical or mechanical issue. The VFD also reduces stress on the booster pump motor. The booster pump motor 30 may be an axial flux motor, which has increased efficiency and has a higher output power to weight ratio.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An irrigation system for irrigating a field, the irrigation system comprising:
   a source conduit for delivering water from a water source;
   a plurality of mobile support towers, each of the plurality of mobile support towers comprising:
      a frame;
      a plurality of wheels attached to the frame for traversing the field; and
      a motor drivably connected to one of the plurality of wheels,
      one of the mobile support towers of the plurality of mobile support towers being an outermost mobile support tower;
   a plurality of irrigation spans, each of the plurality of irrigation spans including a truss section and a pipe, a first irrigation span of the plurality of irrigation spans being an innermost irrigation span connected to the source conduit, a second irrigation span of the plurality of irrigation spans being an outermost irrigation span;

an end gun configured to deliver the water outwardly from the irrigation system to an irrigation area;

an end gun booster pump assembly comprising:
   a booster pump connected to the end gun for stepping up water pressure to the end gun; and
   a booster pump motor configured to drive the booster pump; and a control system including:
   a plurality of sensors configured to sense a plurality of statuses of the irrigation system, the plurality of sensors including a wind sensor configured to sense at least one of a wind speed and a wind direction;
   a processor having a transceiver, the processor being configured to:
     determine a desired end gun throw magnitude based on the irrigation system statuses, a location of the end gun according to Global Positioning System (GPS) data, the at least one of wind speed and wind direction, topographical data, and at least one of a location of an object in the field and a field boundary such that the end gun does not spray the object or spray outside the field boundary;
     generate an instruction to increase or decrease an electrical motor input according to the desired end gun throw magnitude;
     generate a signal representative of the electrical motor input instruction; and
     transmit the electrical motor input instruction signal via the transceiver; and
   a VFD having a transceiver configured to receive the electrical motor input instruction signal transmitted from the processor, the VFD being configured to increase or decrease the electrical motor input according to the electrical motor input instruction so as to increase or decrease the booster pump motor speed such that the booster pump steps up the water pressure to the end gun according to the desired end gun throw magnitude, the VFD being configured to dynamically control the booster pump motor such that water application of the end gun is tailored to the irrigation area.

2. The irrigation system of claim 1, the control system being mounted on one of the plurality of mobile support towers.

3. The irrigation system of claim 1, the control system being configured to communicate with a user input via a wireless network for receiving control instructions or user overrides or for changing operating parameters of the irrigation system.

4. The irrigation system of claim 1, the control system including a user input for receiving control instructions or user overrides or for changing operating parameters of the irrigation system.

5. The irrigation system of claim 1, the control system being configured to communicate with a remote computing device via a wireless network for referencing at least one of irrigation tables, irrigation plans, field layouts, and weather information.

6. The irrigation system of claim 1, the plurality of sensors further including a status sensor configured to sense at least one of an azimuth and a vertical angle of the end gun.

7. The irrigation system of claim 1, the electrical motor input being a function profile.

* * * * *